G. S. MacLEOD.
FRONT BUMPER BRACKET.
APPLICATION FILED FEB. 7, 1921.
1,392,427. Patented Oct. 4, 1921.
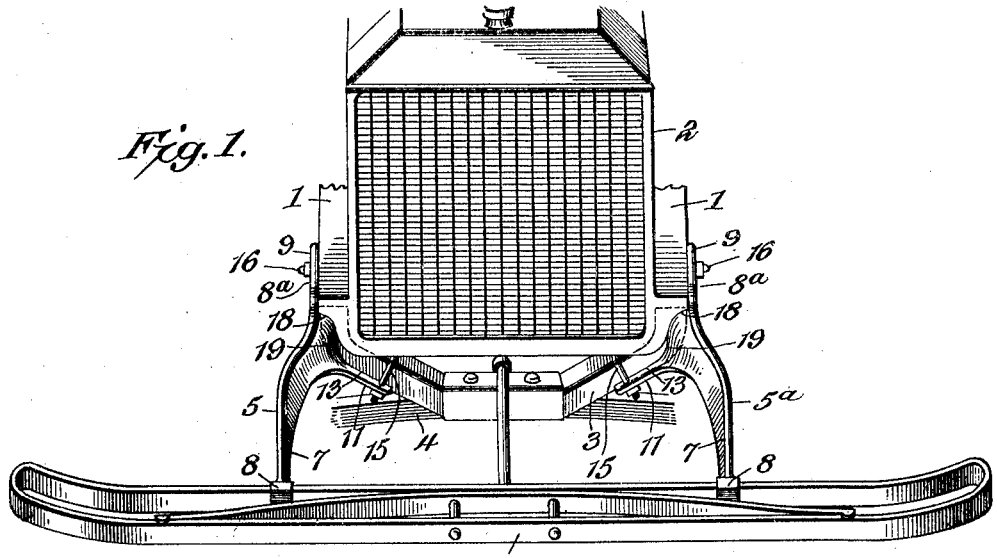
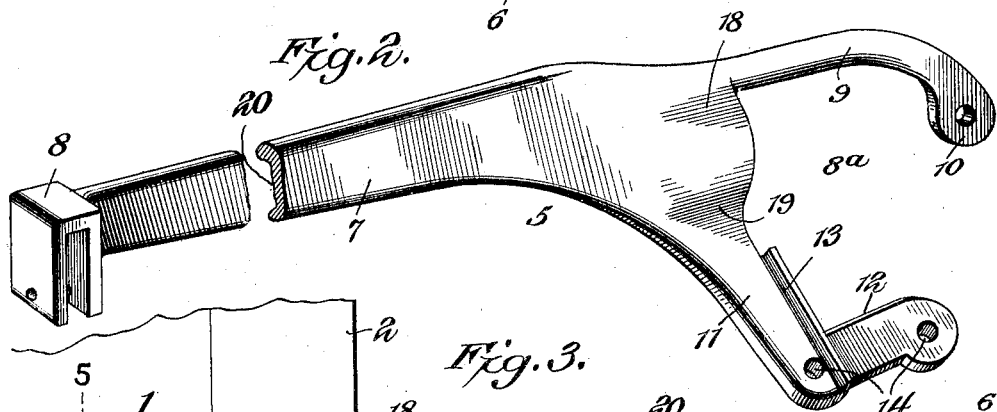
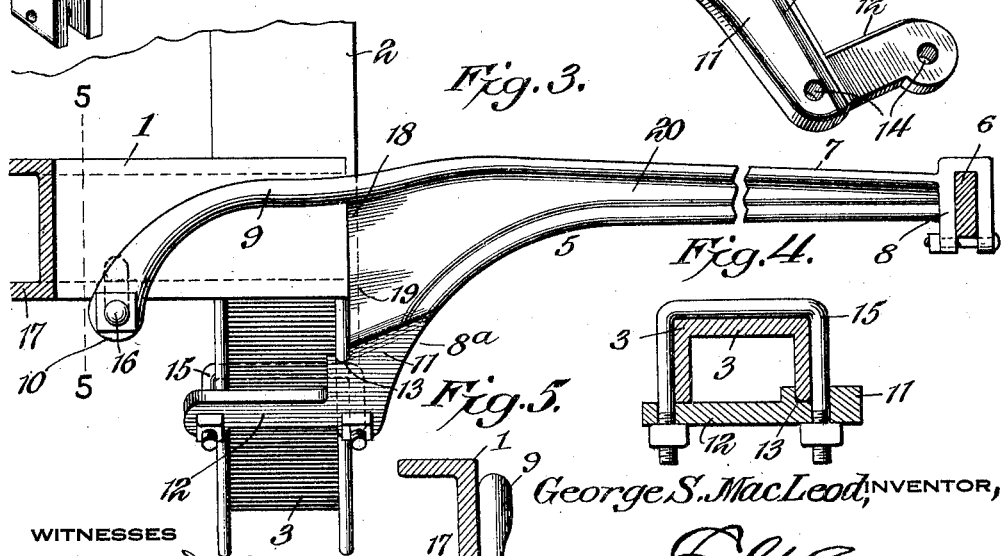
George S. MacLeod, INVENTOR

UNITED STATES PATENT OFFICE.

GEORGE STEWARD MacLEOD, OF SEATTLE, WASHINGTON, ASSIGNOR OF ONE-HALF TO ANGUS P. MacLEOD, OF SEATTLE, WASHINGTON.

FRONT-BUMPER BRACKET.

1,392,427.  Specification of Letters Patent.  Patented Oct. 4, 1921.

Application filed February 7, 1921. Serial No. 443,081.

*To all whom it may concern:*

Be it known that I, GEORGE S. MACLEOD, a citizen of the United States, residing at Seattle, in the county of King and State of Washington, have invented a new and useful Improvement in Front-Bumper Brackets, of which the following is a specification.

This invention has reference to bumper brackets, especially designed for automobiles of the Ford type, and particularly for supporting front bumpers, and its object is to provide a front bracket bumper which may be applied to existing and prevalent types of Ford automobiles, without the necessity of any change whatsoever in the machine frame or parts thereof.

The invention comprises a pair of arms arranged for right and left application to the chassis of the automobile, and so constructed that the attachment of the arms is by way of the side channel beams and the front cross bar underriding the radiator.

The pair of brackets are in the form of castings, each shaped at one end to engage and hold a bumper bar, and at the other end each bracket is forked and bent in such manner that one fork may be bolted to the side channel of the chassis frame and the other fork may be clipped to the front cross arm between such cross arm and the front spring.

The forked end of each bracket is bent into conformity with the shape of the chassis where engaged thereby, whereby providing a particularly rigid connection resistant to vibrations or strains liable to loosen the brackets so that when once applied, the bumper remains fixed to the automobile, even though it frequently performs the function for which it is made, namely, to receive and take up shocks of impact.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawings:

Figure 1 is a perspective of the front end of the automobile with the bumper brackets and bumper applied and showing only such parts as are necessary to illustrate such application.

Fig. 2 is a perspective view of one of the brackets removed from the automobile, such bracket being the left hand bracket, as viewed from in front.

Fig. 3 is an elevation with some parts in section of the bracket shown in Fig. 2.

Fig. 4 is a section of one member of the bracket fork, the front cross bar of the automobile and the connecting clip in the plane of the clip.

Fig. 5 is a section on the line 5—5 of Fig. 3 showing the clip there illustrated in elevation.

Referring to the drawings, there is shown in Figs. 1 and 3 a portion of the side bars 1 of a chassis frame, particularly that of the Ford automobile, and in Fig. 1 there is also shown a radiator 2, while in Figs. 1, 3 and 4 there is shown a front channel cross bar 3 of the chassis, which cross bar sustains the radiator 2 and receives the front spring 4 of the automobile.

The drawings also show brackets 5 and 5ª, so designated because the brackets are rights and lefts, for carrying a bumper 6, but this bumper being of known construction, and forming no part of the present invention, is not herein described.

The brackets 5 and 5ª, being substantially identical except that one is right and the other left, each comprises an arm 7 of generally web and flange construction, with a head 8 at what constitutes the outer end, so as to straddle the appropriate portion of the bumper 6, while at the other end the arm 7 is formed into a fork 8ª, with one branch 9 continued in approximately the line of the arm 7 and then curved into a terminal eye 10 for application to the side bar 1 of the chassis. The fork 8 has another branch 11 projecting at approximately right angles to the main trend of the branch 9 and arm 7 and then projecting in the form of an extension 12 in a plane tilted with relation to the plane of the arm 7 so as to conform to the front cross bar 3 of the chassis frame, and lengthwise, and at the rear edge of the fork member 11 there is produced a groove 13 seating a corresponding edge of the front cross bar 3 of the chassis. The branch 11 of the fork 8 and the angle extension 12 thereof have perforations 14 to pass a U-bolt 15 to embrace the front cross bar 3 and extend through the arm 11 and extension 12 thereof and clamp the named parts to the front cross bar 3. Passed through the eye 10 is a hook bolt 16, with the hook end engaging around one flange 17 of the channel side bar 1 of the chassis to secure the branch 9 of the bracket 5 or 5ª, as the case may be, to the chassis.

In this manner, the two brackets 5 and 5ª may be permanently connected to the front of the automobile against liability of loosening or rattling and the brackets 5 and 5ª are of sufficient length to carry the bumper 6 far enough in advance of the automobile to serve the purpose of a bumper.

In the Ford automobile, the front cross member 3 to which the front spring 4 is clipped fast has terminal rising bends and the forked end of the bracket 5 or 5ª is provided with curved surfaces 18 and 19, conforming to such curvature whereby the bracket seats snugly against the front cross member and is correspondingly firmly braced, giving a wide bearing for the front brackets so that in case of the bumper being called into service there is no liability of their bending or breaking under the impact.

For the purpose of both lightness and strength, the arms 7 are made of web and flange form, thereby providing a longitudinal channel 20 along what constitutes the outer face, that is, the face remote from the longitudinal center line of the vehicle and this arm is so formed as to tilt outwardly from an upright longitudinal plane, with respect to the length of the vehicle. This arrangement provides for the ready gravitation of any water which may come in contact with the lateral outer face of the arm 7.

What is claimed is:—

1. In an automobile fender structure, a supporting bracket for the fender, comprising an arm with a fender or bumper holder at the outer end, and an expanded fork at the inner end having branches, with one branch provided with a terminal eye and a hook bolt traversing it to engage a flange of the outer chassis frame, and the other branch slanting at an angle and terminating in an angle extension, with both the angle slanting portion and the angle extension having perforations for a U-bolt traversing the perforations and embracing the front cross member of the chassis frame.

2. In an automobile fender construction, a bracket comprising an arm of web and flange formation, having a bumper or fender holder at its outer end, and an expanded fork at the inner end, with one branch of the fork having a terminal eye adapted to lie against the outer face of the chassis frame and the other branch of the fork having two angularly related members, each with an eye therein and one member extending at an angle to the other member and the two members being adapted to extend across the front cross member of the chassis frame, the two angularly related members being provided with perforations for the passage of a U-bolt embracing the front cross member of the chassis frame.

3. In an automobile fender construction, a bracket comprising an arm of web and flange formation, having a bumper or fender holder at its outer end, and an expanded fork at the inner end, with one branch of the fork having a terminal eye adapted to lie against the outer face of the chassis frame and the other branch of the fork having two angularly related members, each with an eye therein and one member extending at an angle to the other member and the two members being adapted to extend across the front cross member of the chassis frame, the two angularly related members being provided with perforations for the passage of a U-bolt embracing the front cross member of the chassis frame, the angularly related second named branch having a groove at the junction of the two angularly related portions to receive an edge portion of the front cross member of the chassis frame.

4. In an automobile fender construction, a bracket comprising an arm of web and flange formation, having a bumper or fender holder at its outer end, and an expanded fork at the inner end, with one branch of the fork having a terminal eye adapted to lie against the outer face of the chassis frame and the other branch of the fork having two angularly related members, each with an eye therein and one member extending at an angle to the other member and the two members being adapted to extend across the front cross member of the chassis frame, the two angularly related members being provided with perforations for the passage of a U-bolt embracing the front cross member of the chassis frame, the angularly related second named branch having a groove at the junction of the two angularly related portions to receive an edge portion of the front cross member of the chassis frame, and the forked end of the bracket having a curvature to snugly fit the curved portion of the front of the chassis and adjacent parts.

In testimony that I claim the foregoing as my own I have hereto affixed my signature.

GEORGE STEWARD MacLEOD.